Patented July 8, 1952

2,602,788

UNITED STATES PATENT OFFICE 2,602,788

TETRAKISAZO DYESTUFFS

Walter Anderau, Basel, Switzerland, assignor to Ciba Limited, Basel, Switzerland, a Swiss firm No Drawing. Application December 19, 1947, Serial No. 792,853. In Switzerland January 10, 1947

7 Claims. (Cl. 260—166)

The pertinent literature describes a number of tetrakisazo-dyestuffs which are suitable for making coppered dyeings on cotton in grey to black tints. However, they have the disadvantage of producing no pure, deep black dyeings which at the same time are fast to light. It is the object of the present invention to provide tetrakisazo-dyestuffs which are suitable for making especially pure, deep black dyeings which are very fast to light.

According to this invention valuable new tetrakisazo-dyestuffs are made by coupling a diazo-compound of an amine of the general formula

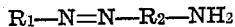

in which $R_1$ represents a benzene residue containing a hydroxyl group and in ortho-position thereto a carboxyl group, and $R_2$ represents a benzene residue in which the azo-group and the diazotisable amino-group are in the 1:4-position relatively to one another, and which contains an alkyl-O-group in ortho-position with respect to the diazotisable amino-group, in an alkaline medium with a disazo-dyestuff of the general formula

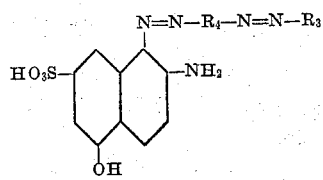

in which $R_3$ represents a benzene residue containing a hydroxyl group and in ortho-position thereto a carboxyl group, and $R_4$ represents a benzene residue in which the azo-groups are in the 1:4-position relatively to one another.

The amines of the above formula

used as starting materials in the present process can be obtained, for example, by coupling the diazo-compound of an amino-hydroxybenzene ortho-carboxylic acid with a 1-amino-2-alkoxybenzene capable of coupling in the 4-position. The amino-hydroxybenzene ortho-carboxylic acid as also the 1-amino-2-alkoxybenzene may contain further substituents. Such substituents in the case of the amino-hydroxybenzene ortho-carboxylic acids, may for example be alkyl groups such as the methyl group, alkoxy groups such as the methoxy group, halogen atoms such as bromine and especially chlorine, nitro groups, sulphon-amide groups, etc. Thus, for example, one may start from 6-amino-4-nitro-1-hydroxy-benzene-2-carboxylic acid. In some cases it is of advantage to use 4-amino-1-hydroxybenzene-2-carboxylic acid or a derivative thereof which contains in the 6-position one of the substituents named above; as examples of such compounds there may be mentioned 6-methyl-, 6-chloro- and 6 - nitro - 4 - amino - 1 - hydroxybenzene - 2-carboxylic acid.

Among the 1-amino-2-alkoxybenzenes unsubstituted in the 4-position, which serve as coupling components for making the amines of the formula $R_1-N=N-R_2-NH_2$, there may be used primarily 2-ethoxy- and 2-methoxy-1-aminobenzenes which contain in the 5-position a substituent which favours the coupling, for example, an alkyl, especially a methyl, group, or an alkoxy group such as an ethoxy- or methoxy-group. If it is desired to use 1-amino-2-alkoxybenzenes which are free from further substituents, such as 1 - amino - 2 - methoxybenzene or 1 - amino - 2 - ethoxybenzene, such compounds are advantageously used in the form of their so-called ω-methane sulphonic acids.

The coupling of the diazotised amino-hydroxy-benzene-ortho-carboxylic acid with the 1-amino-2-alkoxybenzene capable of coupling in the 4-position to produce the starting material of the above formula $R_1-N=N-R_2-NH_2$ to be used in the invention may be carried out in the usual manner in itself known in an acid medium, preferably a medium rendered acid with acetic acid.

A number of the amines of the formula

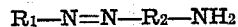

serving as starting materials in the present invention can be made by coupling a diazotised 1-amino-3-alkoxybenzene which contains in the 4-position a group convertible into an $NH_2$-group, for example, a nitro or acylamino group, with a hydroxybenzene-ortho-carboxylic acid capable of coupling, and converting the nitro or acyl-amino group in the resulting azo-dyestuff into an $NH_2$-group. By this method it is possible to prepare, for example, the following amine serving as a starting material in the present invention: 4-amino - 3 - methoxy - 4' - hydroxy - 1:1' - azo-benzene-3'-carboxylic acid-6-sulphonic acid.

The disazo-dyestuffs also serving as starting materials in the invention and having the general formula

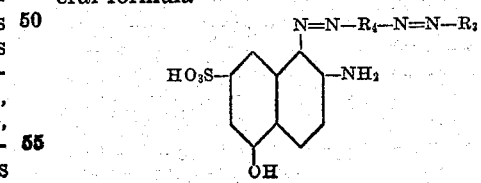

in which $R_3$ and $R_4$ have the meanings given above, can be obtained, for example, by coupling a diazo-compound of an amine of the general formula

$$H_2N-R_4-N=N-R_3$$

with 2-amino-5-hydroxynaphthalene-7-sulphonic acid in an acid medium, advantageously a medium rendered acid with a mineral acid. The amines of the formula

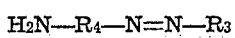
$$H_2N-R_4-N=N-R_3$$

in which $R_3$ represents a benzene residue containing a hydroxyl group and in ortho-position thereto a carboxyl group, and $R_4$ represents a benzene residue in which the azo group and the diazotisable amino group are in the 1:4-position relatively to one another, may be obtained in the same manner as the amines of the formula $$R_1-N=N-R_2-NH_2$$

for example, by coupling the diazo compound of an amino-hydroxybenzene ortho-carboxylic acid with a 1-aminobenzene capable of coupling in the 4-position (as for instance 1-amino-3-methylbenzene, 1-amino-2:5-dimethylbenzene, 1-amino-2-methoxybenzene, 1-amino-3-methoxybenzene, 1-amino-2-ethoxybenzene, 1-amino-2-methoxy-5-methylbenzene, 1-amino-2:5-dimethoxybenzene) or by coupling a diazotised 1-aminobenzene containing in the 4-position a group convertible into an $NH_2$-group, for example, a nitro or acylamino group, with a hydroxybenzene-ortho-carboxylic acid capable of coupling, and converting into an $NH_2$-group the nitro or acylamino group in the resulting azo-dyestuffs. In the amines of the formula

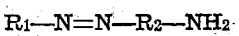
$$H_2N-R_4-N=N-R_3$$

the residue $R_4$ may be free from further substituents as is the case, for example, with 5'-chloro- or 5'-methyl- or 5'-nitro-4-amino-4'-hydroxy-1:1'-azobenzene-3'-carboxylic acid and with 4-amino-4'-hydroxy-1:1'-azobenzene-3'-carboxylic acid, which must be especially mentioned in this connection, or the residue $R_4$ may contain further substituents. Among the substituted amines of the above formula good results may be obtained principally with those which correspond to the general formula

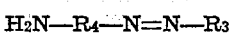

in which one of the substituents $X_2$ and $X_3$ represents hydrogen, alkyl or alkoxy and the other represents alkyl or alkoxy, such, for example, as 2-methyl-4-amino-5-methoxy-2'-hydroxy-5'-nitro-1:1'-azobenzene-3'-carboxylic acid. There are especially suitable as starting material those amines of the above mentioned formula in which $R_3$ represents the residue of a 1-hydroxybenzene-2-carboxylic acid bound in the 4-position to the azo-group. The latter residue may be free from further substitutents, or may contain a further substituent, advantageously in the 6-position, such, for example, as an alkyl group such as methyl, an alkoxy group such as methoxy, a halogen atom such as chlorine, etc. As examples of such amines there may be mentioned 2-methoxy-, 2:5-dimethoxy-, 2-methoxy-5-ethoxy- or 2-methyl-5-methoxy-4-amino-4'-hydroxy-1:1'-azobenzene-3'-carboxylic acid and also substitution products of these compounds which contain in the 5'-position, for example, a methyl group, a chlorine atom, a nitro-group, a methoxy group or a sulphonamide group.

The diazotisation of the amines of the general formula

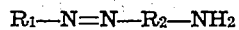
$$R_1-N=N-R_2-NH_2$$

used as starting materials in the invention and of the amines of the general formula

$$H_2N-R_4-N=N-R_3$$

used for preparing the starting materials of the general formula

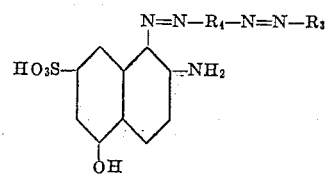

may be carried out, for example, by the so-called indirect method, that is to say, by combining a solution containing an alkali salt of such an amine and also the necessary quantity of nitrite with a dilute acid solution containing a quantity of acid, especially hydrochloric acid, in excess of the theoretical quantity.

The coupling of the diazo-compound of the amine of the general formula

$$R_1-N=N-R_2-NH_2$$

with the disazo-dyestuff of the general formula

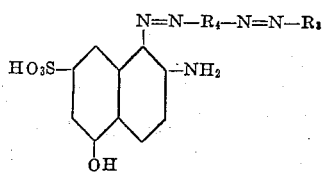

is conducted in an alkaline medium, advantageously rendered alkaline with an alkali carbonate, if desired, with the addition of an agent favouring the coupling reaction or an agent capable of binding acid such as pyridine, ethanolamines, etc.

The tetrakisazo-dyestuffs obtainable by the present invention are new and correspond to the general formula

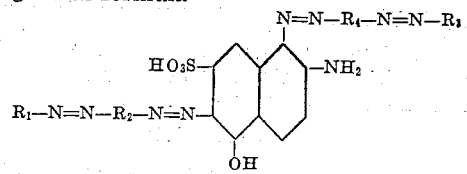

in which $R_1$ and $R_3$ each stand for a benzene radical containing a hydroxyl group and in ortho-position thereto a carboxyl group, $R_2$ stands for a benzene radical in which the two azo-groups are in the 1:4-position relatively to one another and which contains an alkyl-O-group in ortho-position with respect to the azo-group bound to the naphthalene nucleus, and $R_4$ stands for a benzene radical in which the azo-groups are in the 1:4-position relatively to one another.

These dyestuffs are suitable for dyeing a very wide variety of materials, for example, animal fibres such as wool, silk and leather, and especially for dyeing or printing materials containing cellulose such as cotton, linen, artificial silk and staple fibres of regenerated cellulose. The dyestuffs may be converted in substance, in the dyebath or on the fibre into complex metal compounds, for example, copper, chromium, iron, nickel or cobalt compounds. The conversion into such complex metal compounds is carried out by known methods in an acid, neutral or alkaline medium, under atmospheric or superatmospheric pressure, with or without additions such as salts of inorganic or organic acids such as tartaric acid, agents capable of binding acid or favouring the formation of complexes, such as pyridine. The production of metal, especially copper, compounds in substance is of special value in the case of those metal-free dyestuffs which have too weak an affinity and when the metalliferous dyestuffs still possess adequate solubility. In the case of those dyestuffs obtainable by the invention which possess only few groups imparting solubility and have a sufficient or good affinity for cellulose fibres in the metal-free condition, they may, with advantage, be treated with an agent yielding metal by known methods on the fibre or in part on the fibre and in part in the dyebath. It is of advantage, for example, to use the process of U. S. Patent No. 2,148,659 in which first the dyeing and then the treatment with an agent yielding metal are carried out in the same bath. As agents yielding metal there come into consideration advantageously those which are stable towards alkaline solutions, such as complex copper tartrates and the like.

In some cases especially valuable dyeings can be obtained by working in accordance with the process in which dyeings or prints produced with the metal-free dyestuffs are after-treated with aqueous solutions which contain basic condensation products of formaldehyde with compounds containing in the molecule at least once the atomic grouping

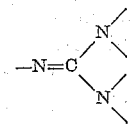

or with compounds capable of being easily transformed into compounds containing said atomic grouping as, for instance, cyanamide, and which solutions also contain water-soluble copper compounds, especially complex copper compounds. Such processes are described, for example, in French Patent No. 929,599. Such dyeing processes may lead to valuable results above all when dark, for example, deep black, tints are to be produced with the dyestuffs obtainable by the invention.

The dyestuffs obtained by the present process are distinguished from known dyestuffs with similar constitution such as, for example, those described in French Patent No. 874,616, in that they serve to make coppered dyeings of especially pure, deep black tints which are considerably faster to light.

The following examples illustrate the invention, the parts and percentages being by weight:

Example 1

25.7 parts of 4-amino-4'-hydroxy-1:1'-azobenzene-3'-carboxylic acid are diazotized with 6.9 parts of sodium nitrite in the presence of 25 parts of hydrochloric acid of 30 per cent. strength, and coupled with a freshly prepared weakly acid suspension of 23.9 parts of 2-amino-5-hydroxynaphthalene-7- sulphonic acid. The coupling which lasts for several hours can be finished by neutralising the free mineral acid with sodium acetate or by heating the mineral acid suspension. The resulting dyestuff suspension is rendered alkaline with 20 parts of sodium carbonate, then heated to 70° C., and the disazo-dyestuff is precipitated by the addition of sodium chloride and separated by filtration. The dyestuff paste is dissolved in 800 parts of water at 50° C., mixed with 25 parts of sodium carbonate, and cooled to 0-2° C. by the addition of ice.

30.1 parts of the monoazo-dyestuff, obtained by coupling the diazo-compound of 15.3 parts of 4 - amino-1-hydroxybenzene - 2 - carboxylic acid with 13.1 parts of 1-amino-2-methoxy-5-methyl-benzene in an acid medium, are suspended in 300 parts of water, brought into solution by neutralisation with caustic soda solution, and diazotised in the presence of 25 parts of hydrochloric acid and 6.9 parts of sodium nitrite. The resulting diazo compound is coupled with the alkaline solution of the disazo-dyestuff obtained as described above. The resulting tetrakis-azo-dyestuff precipitates to a very great extent. After a little time the whole is heated to 60° C., 100 parts of sodium chloride are added in order to obtain the dyestuff in a good filterable form, and the dyestuff is separated by filtration and dried. It is a black powder and corresponds in its free acid state to the formula

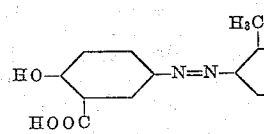
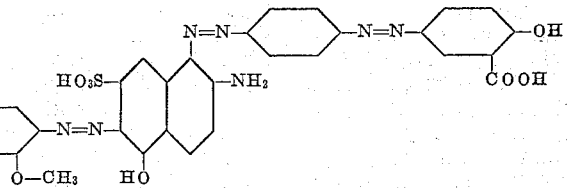

It dissolves with a black-blue coloration in water, in dilute alkalis and in concentrated sulphuric acid. Vegetable fibres and regenerated cellulose are dyed grey to black tints from baths containing sodium sulphate which are neutral or have been rendered weakly alkaline with sodium carbonate. The dyeings are rendered fast to washing and light by treatment with agents yielding metal especially copper salts. Especially valuable bloomy black tints which are fast to washing and light are obtained by dyeing cotton with this dyestuff by the single bath or 2-bath after-coppering process, for example, by the process in which the dyeings produced with the metal-free dyestuff are after-treated in aqueous solutions containing basic condensation products of formaldehyde with compounds which contain in the molecule at least once the atomic grouping

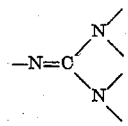

and water-soluble copper compounds.

A dyestuff having similar properties and corresponding, in its free state to the formula

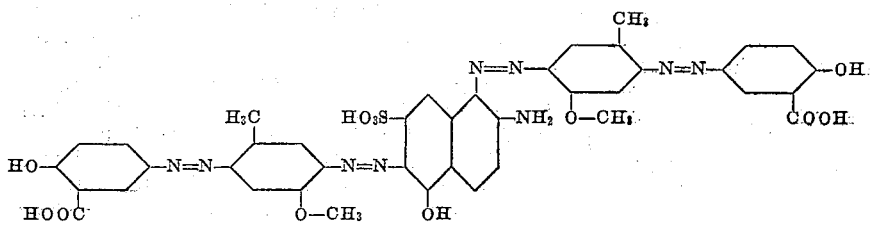

is obtained by diazotising 30.1 parts of 2-methyl-4-amino-5-methoxy - 4'-hydroxy - 1:1'-azobenzene-3'-carboxylic acid, instead of 25.7 parts of 4-amino-4'-hydroxy-1:1'-azobenzene - 3' - carboxylic acid, coupling in an acid medium with 23.9 parts of 2-amino-5-hydroxynaphthalene-7-sulphonic acid, and in other respects working in the manner described above.

Example 2

25.7 parts of 4-amino-4'-hydroxy-1:1'-azobenzene-3'-carboxylic acid are diazotised with 6.9 parts of sodium nitrite in the presence of 25 parts of hydrochloric acid of 30 per cent. strength, and coupled with a freshly prepared weakly acid suspension of 23.9 parts of 2-amino-5-hydroxynaphthalene-7-sulphonic acid. The coupling which lasts for several hours can be finished by neutralising the free mineral acid with sodium acetate or by heating the mineral acid suspension. The resulting dyestuff suspension is rendered alkaline with 20 parts of sodium carbonate, then heated to 70° C., and the disazo-dyestuff is precipitated by the addition of sodium chloride and separated by filtration. The dyestuff paste is dissolved in 800 parts of water at 50° C., mixed with 28 parts of sodium carbonate, and cooled to 0-2° C. by the addition of ice.

31.7 parts of the monoazo-dyestuff, obtained by coupling the diazo-compound of 15.3 parts of 4-amino-1-hydroxybenzene-2-carboxylic acid with 15.3 parts of 1-amino-2:5-dimethoxybenzene in an acid medium, are suspended in 300 parts of water, brought into solution by neutralisation with caustic soda solution, and diazotized at 0-3° C. in the presence of 25 parts of hydrochloric acid and 6.9 parts of sodium nitrite. The resulting diazo compound is coupled with the alkaline solution of the disazo-dyestuff obtained as described above. The tetrakisazo-dyestuff, which is formed after a short time, precipitates. After a little time the whole is heated to 70° C., 100 parts of sodium chloride are added in order to obtain the dyestuff in a good filterable form, and the dyestuff is separated by filtration and dried. The dyestuff thus obtained is a black powder and corresponds in its free acid state to the formula

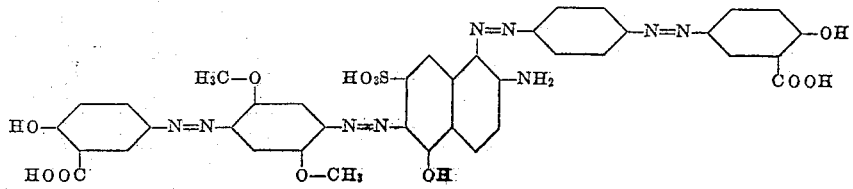

It dissolves with a blackish coloration in water, in dilute alkalis and in concentrated sulfuric acid. Vegetable fibres and regenerated cellulose fibers are dyed greenish grey to black tints from baths containing sodium sulfate which are neutral or have been rendered weakly alkaline with sodium carbonate. The dyeings are rendered fast to washing and light by treatment with agents yielding metal, especially copper salts.

Especially valuable bloomy black tints which are fast to washing and light are obtained by dyeing cotton with this dyestuff by the single bath or 2-bath after-coppering process, for example, by the process in which the dyeings produced with the metal-free dyestuff are aftertreated in aqueous solutions containing basic condensation products of formaldehyde with compounds which contain in the molecule at least once the atomic grouping

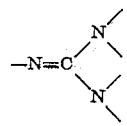

and water-soluble copper compounds.

A dyestuff having similar properties and corresponding in its free acid state to the formula

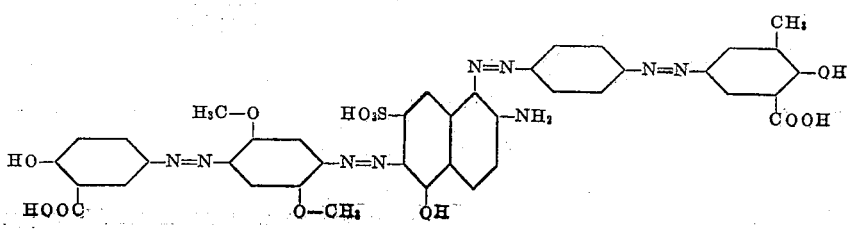

is obtained by diazotising 30.1 parts of 4-amino-5'-methyl-4'-hydroxy - 1:1' - azobenzene-3'-carboxylic acid, instead of 25.7 parts of 4-amino-4'-hydroxy-1:1'-azobenzene-3'-carboxylic acid, coupling in an acid medium with 23.9 parts of 2-amino - 5 - hydroxynaphthalene - 7 - sulphonic acid, and in other respects working in the manner described above.

Example 3

100 parts of cotton are entered at 50° C. into a dyebath consisting of 4000 parts of water, 2 parts of anhydrous sodium carbonate and 2 parts of the dyestuff obtainable as described in the first paragraph of Example 1, the temperature is raised to 90-95° C., in the course of 20 minutes, 30 parts of crystalline sodium sulphate are added, and dyeing is carried on for 30 minutes at 90-100° C. The whole is then allowed to cool to about 70° C., and the further treatment consists of one of the procedures described under (a), (b) and (c) below.

(a) The dyeing is rinsed with cold water and treated for ½ hour at 50° C. in a bath containing 4000 parts of water, 3 parts of crystalline copper sulphate and 1 part of acetic acid. The goods are then rinsed and dried. A deep black dyeing is obtained of good fastness to light and having very good properties of wet fastness.

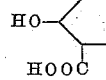

(b) 4 parts of complex copper-sodium tartrate of approximately neutral reaction are added to the dyebath cooled to about 70° C., coppering is carried on for ½ hour at 80° C., and the dyeing is rinsed with cold water. If desired the dyeing may be soaped by after-treatment for ½ hour in a bath containing, per litre, 5 grams of Marseilles soap and 2 grams of anhydrous sodium carbonate. A bloomy black dyeing is obtained which has a good fastness to light and good properties of wet fastness.

(c) The dyeing is rinsed with cold water, and then after-treated for ½ hour at 20° C. in a solution, which has been prepared by dissolving 4.5 parts of the water-soluble condensation product of dicyandiamide and formaldehyde, 1.5 parts of copper acetate and 6 parts of concentrated aqueous ammonia solution in 3000 parts of water and adding 2 parts of anhydrous sodium carbonate to the solution containing cupric tetramine acetate. The goods are then rinsed and dried. There is obtained a deep black dyeing which is distinguished by good fastness to light and very good properties of wet fastness.

What I claim is:

1. A tetrakisazo-dyestuff corresponding in its free acid state to the general formula

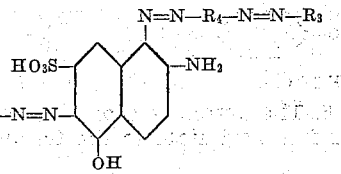

in which $R_1$ and $R_3$ each stand for a benzene radical bound in 1-position to the azo-group and containing in 4-position a hydroxy group and in 3-position a carboxyl group, $R_2$ stands for a benzene radical to which the two adjacent azo-groups are bound in the 1:4-position relatively to one another and which contains an alkyl-O-group in ortho-position with respect to the azo-group bound to the naphthalene nucleus, and $R_4$ stands for a benzene radical to which the adjacent azo-groups are bound in the 1:4-position relatively to one another.

2. A tetrakisazo-dyestuff, corresponding in its free acid state to the general formula

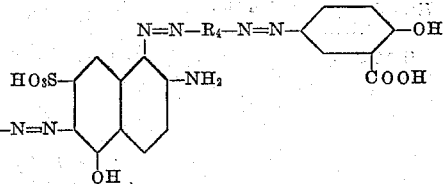

in which $R_2$ stands for a benzene radical to which the two adjacent azo groups are bound in the 1:4-position relatively to one another and which carries an alkyl-O-group containing up to two carbon atoms in ortho-position with respect to the azo-group bound to the naphthalene nucleus, and $R_4$ stands for a benzene radical to which the adjacent azo-groups are bound in the 1:4-position relatively to one another.

3. A tetrakisazo-dyestuff corresponding in its free acid state to the general formula

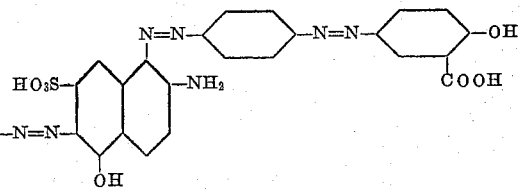

in which $R_2$ stands for a benzene radical to which the adjacent azo-groups are bound in the 1:4-position relatively to one another and which carries an alkyl-O-group containing up to two carbon atoms in ortho-position with respect to the azo-group bound to the naphthalene nucleus.

4. A tetrakisazo-dystuff corresponding in its free acid state to the general formula

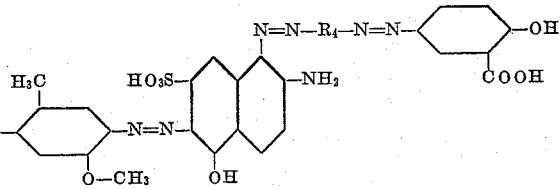

in which $R_4$ stands for a benzene radical to which the adjacent azo-groups are bound in the 1:4-position relatively to one another.

5. The tetrakisazo-dyestuff corresponding in its free acid state to the formula

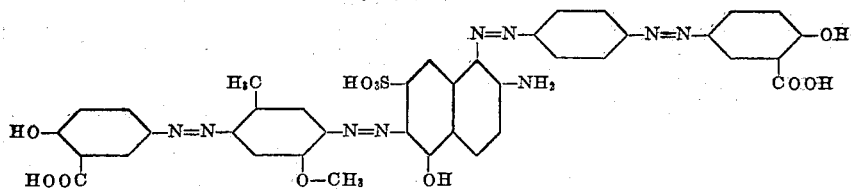

6. The tetrakisazo-dyestuff corresponding in its free acid state to the formula

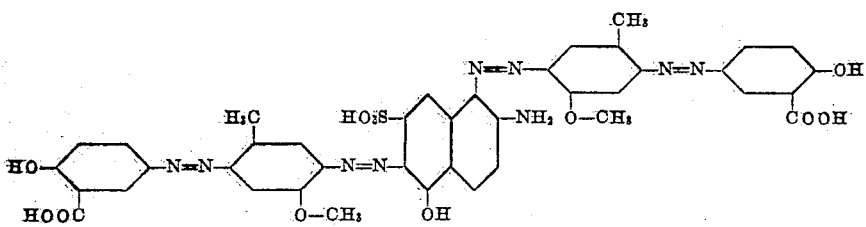

7. The tetrakisazo-dyestuff corresponding in its free acid state to the formula

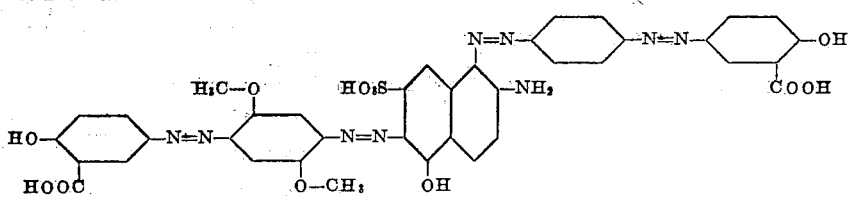

WALTER ANDERAU.

REFERENCES CITED

The following references are of record in the file of this patent:

UNITED STATES PATENTS

| Number | Name | Date |
|---|---|---|
| 2,050,913 | Anderau | Aug. 11, 1936 |
| 2,215,087 | Schweitzer | Sept. 17, 1940 |
| 2,270,675 | Stein et al. | Jan. 20, 1942 |
| 2,435,356 | Kaiser | Feb. 3, 1948 |